(12) United States Patent
Lindholm

(10) Patent No.: US 9,885,166 B2
(45) Date of Patent: Feb. 6, 2018

(54) DEVICE FOR REMOVAL OF OIL UNDER ICE

(71) Applicant: LAMOR CORPORATION AB, Porvoo (FI)

(72) Inventor: Jan-Erik Lindholm, Gäddrag (FI)

(73) Assignee: Lamor Corporation AB, Porvoo (FI)

( * ) Notice: Subject to any disclaimer, the term of this patent is extended or adjusted under 35 U.S.C. 154(b) by 15 days.

(21) Appl. No.: 14/910,546

(22) PCT Filed: Aug. 5, 2014

(86) PCT No.: PCT/FI2014/050606
§ 371 (c)(1),
(2) Date: Feb. 5, 2016

(87) PCT Pub. No.: WO2015/018976
PCT Pub. Date: Feb. 12, 2015

(65) Prior Publication Data
US 2016/0186400 A1    Jun. 30, 2016

(30) Foreign Application Priority Data
Aug. 6, 2013    (FI) ..................................... 20135817

(51) Int. Cl.
*E02B 15/10* (2006.01)
*E02B 15/02* (2006.01)
*B01D 17/02* (2006.01)

(52) U.S. Cl.
CPC ........ *E02B 15/104* (2013.01); *B01D 17/0202* (2013.01); *E02B 15/02* (2013.01)

(58) Field of Classification Search
CPC ........ E02B 15/02; E02B 15/10; E02B 15/101; E02B 15/104

USPC ........ 210/747.5, 747.6, 776, 170.05, 170.09, 210/170.11, 242.3, 242.4, 923, 924
See application file for complete search history.

(56) References Cited

U.S. PATENT DOCUMENTS

| 3,744,638 A | 7/1973 | Rhodes |
| 4,116,833 A * | 9/1978 | Stagemeyer .......... E02B 15/048 210/242.3 |
| 4,146,477 A | 3/1979 | Challener |
| 4,349,439 A * | 9/1982 | Lundin ................. E02B 15/101 210/242.3 |

(Continued)

FOREIGN PATENT DOCUMENTS

| FI | 60424 B | 9/1981 |
| SU | 1765292 A1 | 9/1992 |
| WO | WO 97 15732 A1 | 5/1997 |

OTHER PUBLICATIONS

Alaska Clean Seas. Alaska Clean Seas Technical Manual, vol. 1, Tactics Descriptions, Revised Mar. 2003, Chapter R14, (Mar. 2003)175 pages.

*Primary Examiner* — Christopher Upton
(74) *Attorney, Agent, or Firm* — Alston & Bird LLP

(57) ABSTRACT

Provided is a device for removal of oil under ice through an opening made into ice. The device comprises a long rope mop in the form of an endless loop, a propulsion device provided with a deflection wheel for pulling the rope mop substantially straight under ice, a power device provided with a drive wheel for circulation of the loop through the drive wheel and the deflection wheel and a cleaning device for cleaning of the rope mop from any impurities adhered thereto.

10 Claims, 3 Drawing Sheets

(56) References Cited

U.S. PATENT DOCUMENTS

| | | | | |
|---|---|---|---|---|
| 5,423,985 A * | 6/1995 | Addeo | E02B 15/10 | |
| | | | 210/242.4 | |
| 5,846,432 A * | 12/1998 | Brinkley | E02B 15/104 | |
| | | | 210/691 | |
| 6,221,256 B1 * | 4/2001 | Kimura | E02B 15/06 | |
| | | | 210/170.05 | |
| 6,592,765 B1 * | 7/2003 | Mykkanen | E02B 15/045 | |
| | | | 210/170.05 | |
| 7,182,860 B2 * | 2/2007 | Lundin | E02B 15/106 | |
| | | | 210/242.3 | |
| 8,025,460 B2 * | 9/2011 | Cobb | E02B 15/08 | |
| | | | 405/61 | |
| 8,343,358 B2 * | 1/2013 | Immonen | B63B 35/32 | |
| | | | 210/170.05 | |
| 2014/0319076 A1 * | 10/2014 | Galushko | B63G 8/001 | |
| | | | 210/747.6 | |
| 2016/0017561 A1 * | 1/2016 | Lindholm | E02B 15/10 | |
| | | | 210/242.3 | |

* cited by examiner

DEVICE FOR REMOVAL OF OIL UNDER ICE

FIELD

The invention relates to a device for removal of oil and other impurities floating in, i.e. lighter than, water under ice through an opening made into ice.

BACKGROUND

Removal of oil from the surface of water by oil booms and skimmers provided with rotating brushes is an advanced and functional technique. In addition, particularly in limited areas, such as basins, oil is effectively collected by the so-called rope mop technique. The rope mop is a long endless rope which is made into a soft and thick weave, a hairy yarn structure or an equivalent airy assembly floating in water. It can be circulated through appropriate deflection wheels provided on the surface of water and raised onto a drive wheel so as to be squeezed clean before being conveyed back into water. This way, the rope mop absorbs impurities from the surface of water. Its yarn structure and thereby the absorbency may vary according to the quality of the impurity being currently collected. In addition, devices have been developed for recovery of oil among ice, at least to a certain extent. However, in accidents occurring in winter, oil often migrates under the solid ice, in which case the known oil collection techniques are not working to remove the layer of oil present against the lower surface of ice.

SUMMARY

The objective of the invention is to disclose a novel device specifically suited for removal of oil and equivalent impurities from the lower surface of solid ice.

The device according to the invention is designed for removal of oil and equivalent floating impurities from the lower surface of solid ice through an opening made into ice both in the sea and lakes as well as closed basin areas. The device according to the invention includes a long rope mop formed as an endless loop and a deflection wheel at a distance from the opening under ice. Furthermore it includes a power device provided with a drive wheel for circulation of the loop through the drive wheel and the deflection wheel and a cleaning device for cleaning of the rope mop from any impurities adhered thereto.

In an embodiment of the invention the device according to the invention comprises a propulsion device provided with said deflection wheel for pulling the loop substantially straight under ice.

In another embodiment of the invention said deflection wheel is stationary and in place in another opening under ice.

The rope mop for use in the device according to the invention consists of a yarn structure floating in water and absorbing oil. It is a thick and soft, endless belt known per se in the field of oil spill response, with an absorbing structure which may, in terms of its material and detailed composition, vary according to the type of oil or other equivalent impurity currently being collected. Thus, the rope mop is provided with optimal absorbency characteristics.

The propulsion device for use in the device according to the invention is floating in order to hold the circulating rope mop against the lower surface of ice.

The propulsion device preferably includes a frame to which the deflection wheel is supported and a pulling means for pulling the propulsion device and the rope mop away from the opening made into ice. The pulling means may be a propeller rotating outside of the frame. The pulling means may also be implemented as a water jet device in which case a propeller or the like is placed in a passage through the frame for providing a water flow through the passage.

In one embodiment of the invention the pulling direction of the pulling means is provided at an angle relative to the direction of the rope mop extending from the opening. This way, the pulling means first pulls the rope mop straight in any direction from the opening made into ice and then, while keeping the rope mop relatively tight, rotates the rope mop in a circle under ice around the opening made into ice. Thus, the rope mop brushes the lower surface of ice over a circular area around the opening.

The propulsion device of the pulling means requires energy in order to operate. Since the pulling means must be small, light and well-floating in order to operate well, it is not worthwhile to accommodate large engines or energy sources in the pulling means itself. Thus, the pulling means is preferably connected by a power transmission connection, such as a hydraulic hose or electric wire, to an energy source, such as a power device. This way, it suffices that the actual pulling means be provided with a small and light hydraulic motor or electric motor by which the propulsion device operates.

The device according to the invention has considerable advantages compared with the prior art.

The device according to the invention is simple, reliable and small. In order to install it for instant use, only a sufficiently large opening must be made into ice so that the device can be introduced into water.

BRIEF DESCRIPTION OF THE DRAWINGS

The accompanying drawings, which are included to provide a further understanding of the invention and constitute a part of this specification, illustrate one embodiment of the invention and together with the description help to explain the principles of the invention.

In the drawings.

DETAILED DESCRIPTION

Figure 1:
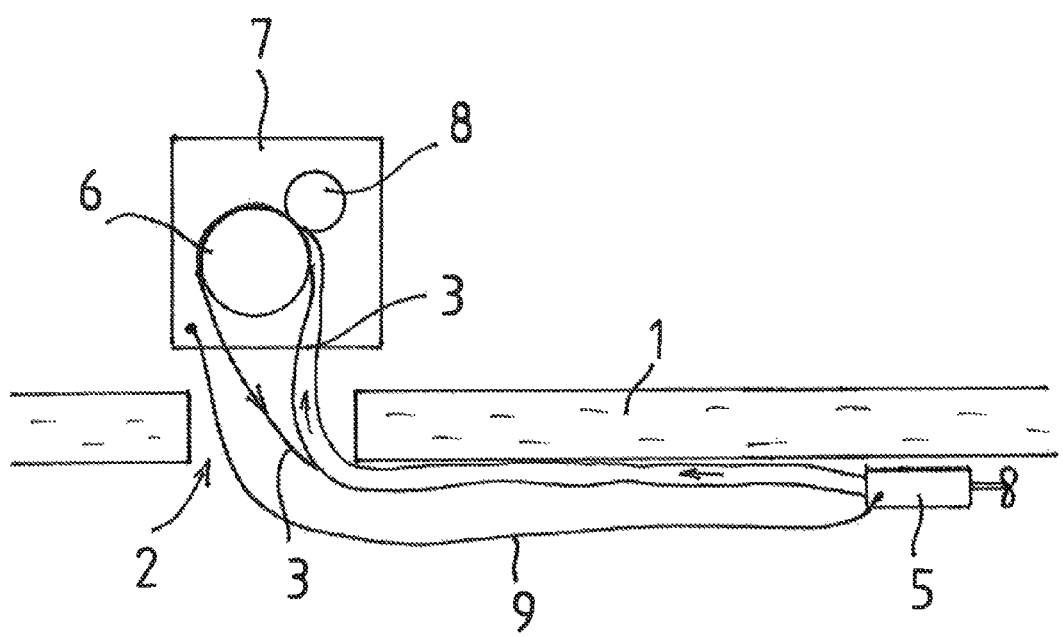
FIG. 1 schematically illustrates the device according to the invention as seen from the side.
Figure 2:
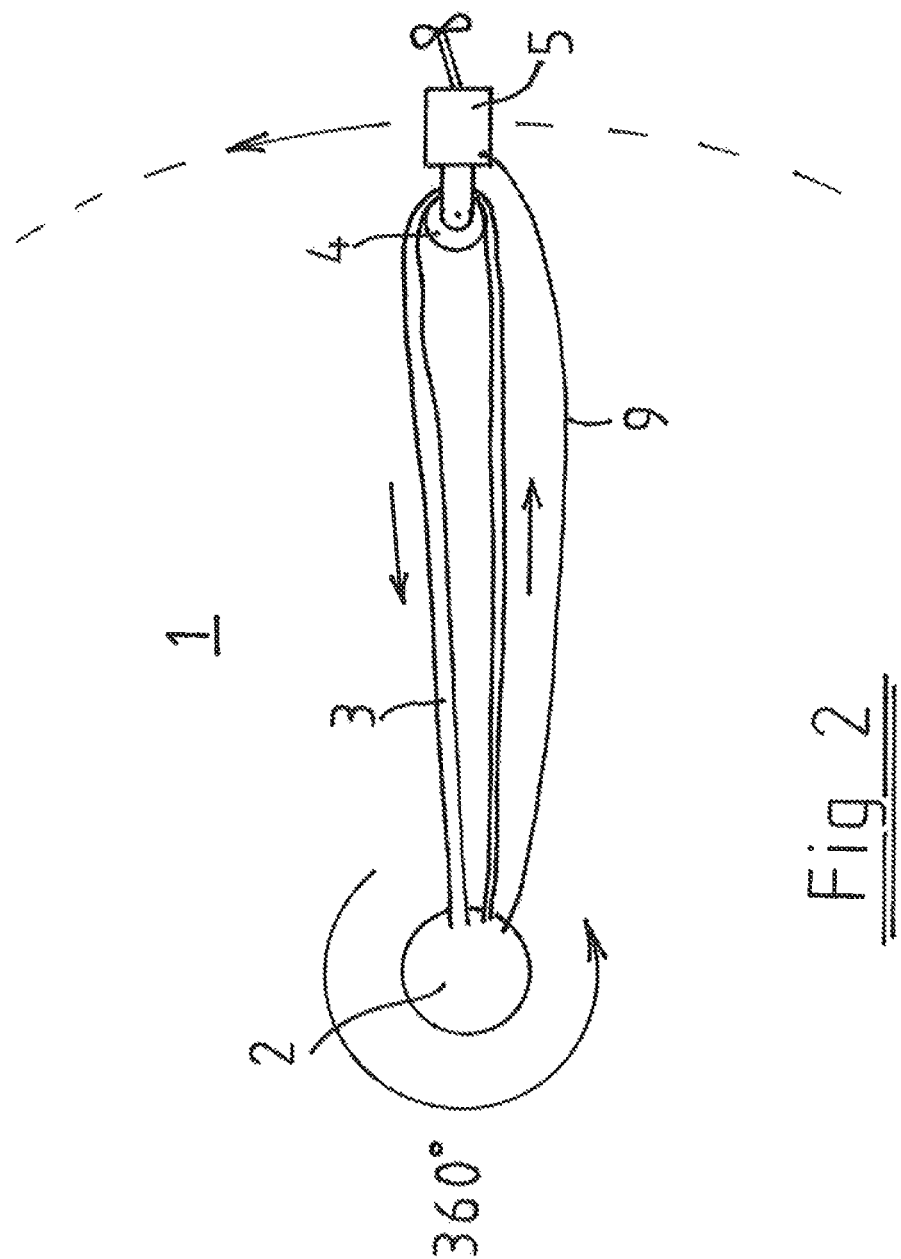
FIG. 2 illustrates the same device from below, i.e. under ice and FIG. 3 schematically illustrates another embodiment of the invention as seen from the side.

The device according to the invention illustrated in the FIGS. 1 and 2 is placed on ice 1 in the vicinity of an opening 2 made into ice. The device includes a power device 7 with a drive wheel 6. A rope mop 3 in the form of an endless belt, i.e. a loop, circulates through the drive wheel. Further, the power device 7 has a cleaning device 8, i.e. in this embodiment a press roll, pressing the rope mop 3 against the drive wheel. This way, the rope mop 3 is squeezed up and substantially dried, i.e. the liquid material absorbed under water is separated.

The rope mop 3 is arranged to pass into water through the opening 2 in ice so as to float, i.e. be disposed against the lower surface of ice 2, as it is lighter than water. Under ice, there is also a propulsion device 5, through a deflection wheel 4 of which the rope mop 3 in the form of a loop circulates. The propulsion device is provided with a propeller or water jet pulling the loop of the rope mop relatively straight away from the opening 2 in ice. Further, the pulling effect or pushing effect of the propulsion device is provided at an oblique angle relative to the principal direction of the rope mop.

Thus, the propulsion device first pulls the rope mop straight and then begins to move the rope mop around the opening 2 in such a way as to sweep the lower surface of ice around the opening 2 by the rotating rope mop, the radius of the circle of the circular area corresponding to the reach of the rope mop under ice. The propulsion device 5 is connected to the power device by a power transmission connection 9 that may be a hydraulic hose or an electric cable.

To use the device according to the invention is very simple. In the oil accident area, an opening 2 is made into ice 1 and the power device 7 is brought to the vicinity of the opening. The power device may be provided with its own engine, such as an internal combustion engine, to make it operate completely independently. The propulsion device 5 is introduced into water from the opening made into ice, the rope mop 3 passing through the deflection wheel thereof. Thus, the propulsion device pulls the rope mop into water onto the lower surface of ice, while one end thereof circulates through the drive wheel of the power device. Once the rope mop is straight, the device can be started, so that the propulsion device would turn the rope mop in such a way as to sweep through a circular area having the opening 2 as the center. As the rope mope passes to the cleaning device 8 of the power device 6 it is squeezed clean from oil before being conveyed back under water. Several rounds can be made as long as any impurities are being recovered. Then, another opening is made into ice at an appropriate distance and the purification is continued. To make the rope mop pass from the opening into water under ice and back in a flexible way, the lower edge of the opening can be rounded. In addition, it is possible to place rolls or curved and slippery guide surfaces on the level of the lower surface of ice in the opening to allow the rope mop slide in a steady fashion.

Figure 3:
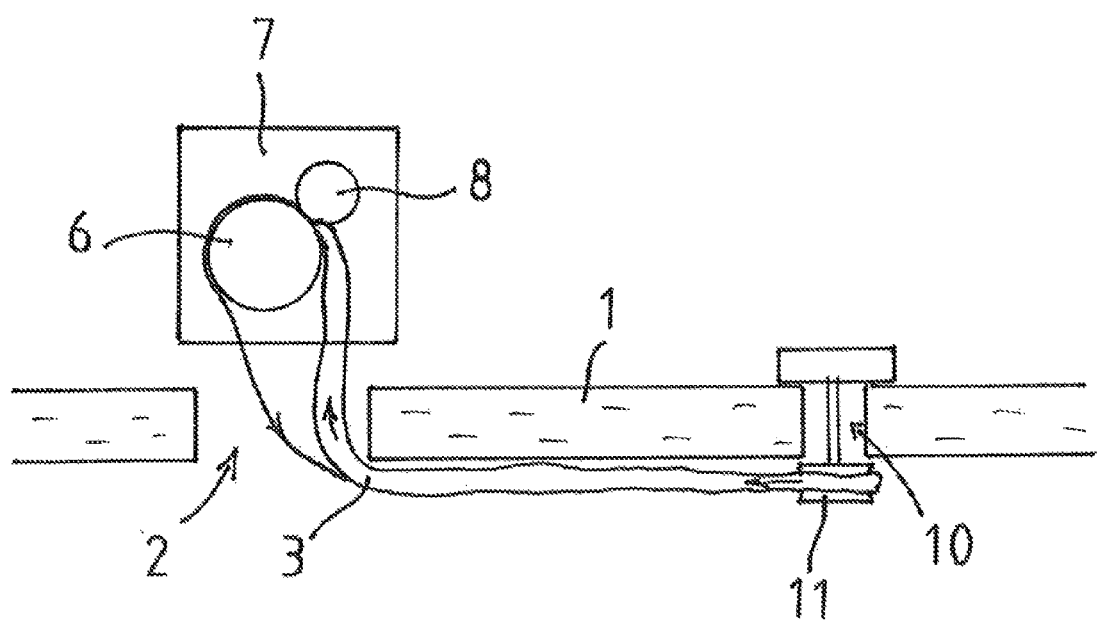

The embodiment of FIG. 3 includes a power device 7 with a drive wheel 6. A rope mop 3 in the form of an endless belt, i.e. a loop, circulates through the drive wheel. Further, the power device 7 has a cleaning device 8, i.e. in this embodiment a press roll, pressing the rope mop 3 against the drive wheel. This way, the rope mop 3 is squeezed up and substantially dried, i.e. the liquid material absorbed under water is separated.

The rope mop 3 is arranged to pass into water through the opening 2 in ice so as to float, i.e. be disposed against the lower surface of ice 1, as it is lighter than water. At a distance from the opening 2 there is in the ice also another opening 10 provided with a deflection wheel 11 under ice so that the rope mop 3 in the form of a loop circulates both wheels 6 and 11. Thus the circulating rope mop sweeps the lower surface of ice between the openings 2 and 10.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A device for removal of oil under ice through an opening made into ice, wherein the device comprises a long rope mop in the form of an endless loop, a deflection wheel at a distance from the opening under ice, a power device provided with a drive wheel for circulation of the loop through the drive wheel and the deflection wheel, and a cleaning device for cleaning of the rope mop from any impurities adhered thereto, wherein the rope mop is configured to be disposed against a lower surface of ice; and the device further comprises a propulsion device provided with the deflection wheel configured for pulling the rope mop substantially straight under ice, and the propulsion device includes a frame for supporting the deflection wheel and a pulling means for pulling the propulsion device and the rope mop away from the opening made into ice.

2. The device according to claim 1, wherein the rope mop consists of a yarn structure configured to float in water and absorb oil.

3. The device according to claim 1, wherein the propulsion device is configured to float for holding the circulating rope mop against the lower surface of ice.

4. The device according to claim 1, wherein the pulling direction of the pulling means is provided at an angle relative to the direction of the rope mop extending from the opening for rotation of the rope mop in a circle under ice around the opening made into ice.

5. The device according to claim 1, wherein the pulling means is connected by a power transmission connection to an energy source.

6. The device according to claim 5, wherein the power transmission connection is a hydraulic hose.

7. The device according to claim 5, wherein the power transmission connection is an electric wire.

8. The device according to claim 5, wherein the energy source is a power device.

9. The device according to claim 1, wherein the pulling means is a propeller.

10. The device according to claim 1, wherein the rope mop comprises a yarn structure configured to float in water and absorb oil.

* * * * *